(12) United States Patent
Zhang et al.

(10) Patent No.: US 11,962,749 B2
(45) Date of Patent: Apr. 16, 2024

(54) VIRTUAL REALITY INTERACTION METHOD, DEVICE AND SYSTEM

(71) Applicant: QINGDAO PICO TECHNOLOGY CO., LTD., Shandong (CN)

(72) Inventors: Xiuzhi Zhang, Shandong (CN); Hongwei Zhou, Shandong (CN); Guanghui Liu, Shandong (CN); Hengjiang Guo, Shandong (CN)

(73) Assignee: QINGDAO PICO TECHNOLOGY CO., LTD. (CN)

( * ) Notice: Subject to any disclaimer, the term of this patent is extended or adjusted under 35 U.S.C. 154(b) by 0 days.

(21) Appl. No.: 17/819,500

(22) Filed: Aug. 12, 2022

(65) Prior Publication Data

US 2022/0385884 A1    Dec. 1, 2022

Related U.S. Application Data

(63) Continuation of application No. PCT/CN2021/118546, filed on Sep. 15, 2021.

(30) Foreign Application Priority Data

Sep. 16, 2020 (CN) .......................... 202010973542.2

(51) Int. Cl.
*H04N 13/296* (2018.01)
*H04N 13/139* (2018.01)
(Continued)

(52) U.S. Cl.
CPC ......... *H04N 13/296* (2018.05); *H04N 13/139* (2018.05); *H04N 13/243* (2018.05); *H04N 13/275* (2018.05); *H04N 13/366* (2018.05)

(58) Field of Classification Search
CPC .. H04N 13/296; H04N 13/139; H04N 13/243; H04N 13/275; H04N 13/366; H04N 13/332
(Continued)

(56) References Cited

U.S. PATENT DOCUMENTS 5,144,445 A * 9/1992 Higashitsutsumi .. H04N 5/3765
348/311
2003/0133018 A1 7/2003 Ziemkowski
(Continued)

FOREIGN PATENT DOCUMENTS

CN     107168523 A     9/2017
CN     107948463 A     4/2018
(Continued)

OTHER PUBLICATIONS

Office Action dated Dec. 10, 2021 in CN Application No. 202010973542.2, English translation (8 pages).
(Continued)

*Primary Examiner* — Tung T Vo

(57) ABSTRACT

A method and system for aligning exposure center points of multiple cameras in a VR system are provided. The method includes: acquiring image data of a first type frame according to a preset frame rate; adjusting VTS data of the first type frame, the VTS data changing with the change of the exposure parameters so as to fix a time interval between an exposure center point of the first type frame and an FSIN synchronization signal in a VR system; acquiring image data of a second type frame according to the preset frame rate; and adjusting VTS data of the second type frame according to the VTS data of the first type frame, and fixing a time interval between an exposure center point of the second type frame and the FSIN synchronization signal so as to complete the alignment of exposure center points of the cameras.

18 Claims, 2 Drawing Sheets

(51) Int. Cl.
*H04N 13/243* (2018.01)
*H04N 13/275* (2018.01)
*H04N 13/366* (2018.01)

(58) Field of Classification Search
USPC .......................................................... 348/48
See application file for complete search history.

(56) References Cited

U.S. PATENT DOCUMENTS

| | | | |
|---|---|---|---|
| 2009/0231465 A1 | 9/2009 | Senba | |
| 2013/0010182 A1 | 1/2013 | Kino et al. | |
| 2013/0286214 A1* | 10/2013 | Woo | H04N 5/33 |
| | | | 348/164 |
| 2016/0127641 A1* | 5/2016 | Gove | H04N 5/23238 |
| | | | 348/143 |
| 2016/0261807 A1 | 9/2016 | Seshadrinathan et al. | |
| 2016/0316110 A1 | 10/2016 | Ross et al. | |
| 2017/0142312 A1 | 5/2017 | Dal Mutto et al. | |
| 2017/0262045 A1 | 9/2017 | Rouvinez et al. | |
| 2018/0198989 A1* | 7/2018 | Macmillan | H04N 5/247 |
| 2018/0309919 A1 | 10/2018 | Naing et al. | |
| 2018/0330521 A1 | 11/2018 | Samples et al. | |
| 2019/0110039 A1 | 4/2019 | Linde et al. | |
| 2019/0114830 A1 | 4/2019 | Bouazizi et al. | |
| 2019/0313039 A1* | 10/2019 | Aggarwal | H04N 5/2258 |
| 2022/0228871 A1* | 7/2022 | Ohata | G01S 7/4808 |
| 2022/0385884 A1 | 12/2022 | Zhang et al. | |

FOREIGN PATENT DOCUMENTS

| | | |
|---|---|---|
| CN | 108829627 A | 11/2018 |
| CN | 109697002 A | 4/2019 |
| CN | 109889690 A | 6/2019 |
| CN | 110139066 A | 8/2019 |
| CN | 110198415 A | 9/2019 |
| CN | 110612506 A | 12/2019 |
| CN | 111355897 A | 6/2020 |
| CN | 111459279 A | 7/2020 |
| CN | 111476907 A | 7/2020 |
| CN | 111669479 A | 9/2020 |
| CN | 109729278 A | 12/2020 |
| CN | 112203076 A | 1/2021 |
| CN | 107409176 B | 7/2021 |
| JP | 2009232340 A | 10/2009 |
| JP | 5050256 B1 | 8/2012 |
| WO | 20191996121 A1 | 10/2019 |

OTHER PUBLICATIONS

Written Opinion dated Nov. 9, 2021 in PCT/CN2021/118546, English translation (6 pages).
Xiaoyu, Z., Real scene modeling based on multi-level fusion for VR, Central China Normal University, College of Physical Science and Technology, Apr. 2019, English translation of abstract only (67 pages).
Extended European Search Report and Opinion issued Jan. 26, 2024 in European Application No. 21868656.6 (11 pages).

* cited by examiner

VIRTUAL REALITY INTERACTION METHOD, DEVICE AND SYSTEM

CROSS-REFERENCE TO RELATED APPLICATION

The present disclosure is a continuation of PCT/CN2021/118546 filed Sep. 15, 2021 which claims priority to Chinese Patent Application No. CN202010973542.2, filed on Sep. 16, 2020 and entitled "Method and System for Aligning Exposure Center Points of Multiple Cameras in VR System", the disclosure of which is hereby incorporated by reference in its entirety.

TECHNICAL FIELD

The present disclosure relates to the field of computer vision, and in particular, to a method and system for aligning exposure center points of multiple cameras in a VR system.

BACKGROUND

In the existing all-in-one VR 6DOF designs, headset optical tracking is mostly realized by two cameras, and the two cameras have the same configuration parameters. In automatic exposure designs, the two cameras also have the same exposure parameters, so that the two cameras can achieve the alignment of camera exposure center points. Since the two cameras have a blind area on Field Of View (FOV), if there is an optical handle tracking requirement, the problem of handle blind area will be more obvious. Therefore, it is necessary to add more cameras in a tracking system, so the existing multiple cameras may be placed in upper, lower, left and right parts, there may be different light rays of each camera corresponding to the environment, each camera needs to be set with different exposure parameters, and it is difficult to complete the alignment of exposure center points of multiple cameras by setting different exposure parameters.

Therefore, there is a need for a method and system for aligning exposure centers of multiple cameras in a VR system under different exposure parameters.

SUMMARY

In view of the above problems, embodiments of the present disclosure provide a method and system for aligning exposure center points of multiple cameras in a VR system, so as to solve the problems that multiple cameras are arranged in an existing VR system with optical tracking requirements and are respectively placed in upper, lower, left and right parts, there may thus be a case where light rays of each camera corresponding to the environment are different, each camera needs to be set with different exposure parameters, and it is difficult to complete the alignment of exposure center points of multiple cameras by setting different exposure parameters.

A method for aligning exposure center points of multiple cameras in a VR system provided according to an embodiment of the present disclosure includes the following steps.

Image data of a first type frame is acquired according to a preset frame rate, the first type frame is configured to track an external object, and exposure parameters of each camera in a tracking process dynamically change according to the change of the external object.

VTS data of the first type frame is adjusted, and the VTS data changes with the change of the exposure parameters so as to fix a time interval between an exposure center point of the first type frame and an FSIN synchronization signal in a VR system.

Image data of a second type frame is acquired according to the preset frame rate, the second type frame is configured to track an optical handle, and the exposure parameters of each camera in a tracking process are consistent.

VTS data of the second type frame is adjusted according to the VTS data of the first type frame, and a time interval between an exposure center point of the second type frame and the FSIN synchronization signal is fixed so as to complete the alignment of exposure center points of the cameras.

In an embodiment, the preset frame rate is 60 Hz.

In an embodiment, the external object is an external environment or a human body part.

In an embodiment, before VTS data of the first type frame is adjusted, the method further includes the following steps.

A scanning time of each line of data is calculated according to HTS settings of a data image and a clock frequency in the VR system, and a default VTS value of an image sensor in the VR system is obtained.

In an embodiment, the process of adjusting VTS data of the first type frame includes the following steps.

Exposure parameters of the first type frame are obtained.

VTS data of the first type frame is calculated through the exposure parameters, and the VTS data is written into a register of the image sensor.

In an embodiment, in the process of dynamic change of exposure parameters of each camera in a tracking process according to the change of the external object, as an environment of the external object is darker, the exposure parameters are larger; and as an environment of the external object is brighter, the exposure parameters are smaller.

In an embodiment, in the process of change of the VTS data with the change of the exposure parameters, if the exposure parameters are increased, a value of the VTS data is increased; and if the exposure parameters are reduced, a value of the VTS data is reduced.

In an embodiment, the process of adjusting VTS data of the second type frame according to the VTS data of the first type frame includes the following step.

A sum of the value of the VTS data of the second type frame and the value of the VTS data of the first type frame is taken as a fixed value.

In an embodiment, center points of the first type frame and the second type frame are aligned after the process of fixing a time interval between an exposure center point of the second type frame and the FSIN synchronization signal in the VR system.

In the whole acquisition process of the VR system acquiring image data, the center points of the first type frame and the second type frame are aligned successively and repeatedly so as to align exposure center points of cameras in the whole VR tracking process.

An embodiment of the present disclosure also provides a system for aligning exposure center points of multiple cameras in a VR system, configured to implement the foregoing method for aligning exposure center points of multiple cameras in a VR system. The system includes: a type frame division module, a camera, a first type frame processing module and a second type frame processing module.

The type frame division module is configured to instruct the camera to successively obtain a first type frame and a second type frame.

The camera is configured to successively acquire image data of the first type frame and the second type frame according to the instruction of the type frame division module, and acquire image data according to a preset frame rate.

The first type frame processing module is configured to adjust VTS data of the first type frame so that the VTS data changes with the change of the exposure parameters so as to fix a time interval between an exposure center point of the first type frame and an FSIN synchronization signal in a VR system.

The second type frame processing module is configured to adjust VTS data of the second type frame according to the VTS data of the first type frame, and fix a time interval between an exposure center point of the second type frame and the FSIN synchronization signal so as to complete the alignment of exposure center points of the cameras.

It can be seen from the above technical solution that in the method and system for aligning exposure center points of multiple cameras in a VR system provided by the embodiments of the present disclosure, acquired image data is divided into a first type frame and a second type frame, and the first type frame and the second type frame are processed respectively. The first type frame is used for tracking an external object, and exposure parameters of a camera dynamically change according to the change of the external object in a tracking process, thereby adjusting VTS data of the first type frame so that the VTS data changes with the change of the exposure parameters so as to fix a time interval between an exposure center point of the first type frame and an FSIN synchronization signal in a VR system. Exposure parameters of a camera in a tracking process of the second type frame are consistent. According to this feature, an exposure center point of the second type frame has a fixed time interval with the FSIN synchronization signal in the VR system, thereby completing the alignment of center points of the first type frame and the second type frame. When the remaining image data is obtained, the alignment of the center points of the first type frame and the second type frame are successively and repeatedly completed, and then the exposure center points of the cameras in the whole VR tracking process are aligned. Thus, even if more cameras are added to meet optical handle tracking requirements, each camera is set with different exposure parameters, and the alignment of exposure center points can be completed, so as to realize the stable output of the whole VR system and improve the comfort and immersion of users.

BRIEF DESCRIPTION OF THE DRAWINGS

Other objects and results of the present disclosure will become more apparent and appreciated by reference to the following description taken in conjunction with the accompanying drawings, and as the present disclosure becomes more fully understood. In the drawings.

DETAILED DESCRIPTION OF THE EMBODIMENTS

Multiple cameras are arranged in an existing VR system with optical tracking requirements and are respectively placed in upper, lower, left and right parts, there may thus be a case where light rays of each camera corresponding to the environment are different, each camera needs to be set with different exposure parameters, and it is difficult to complete the alignment of exposure center points of multiple cameras by setting different exposure parameters.

Aiming at the above problems, an embodiment of the present disclosure provides a method for aligning exposure center points of multiple cameras in a VR system. Specific embodiments of the present disclosure are described in detail below with reference to the accompanying drawings.

Figure 1:
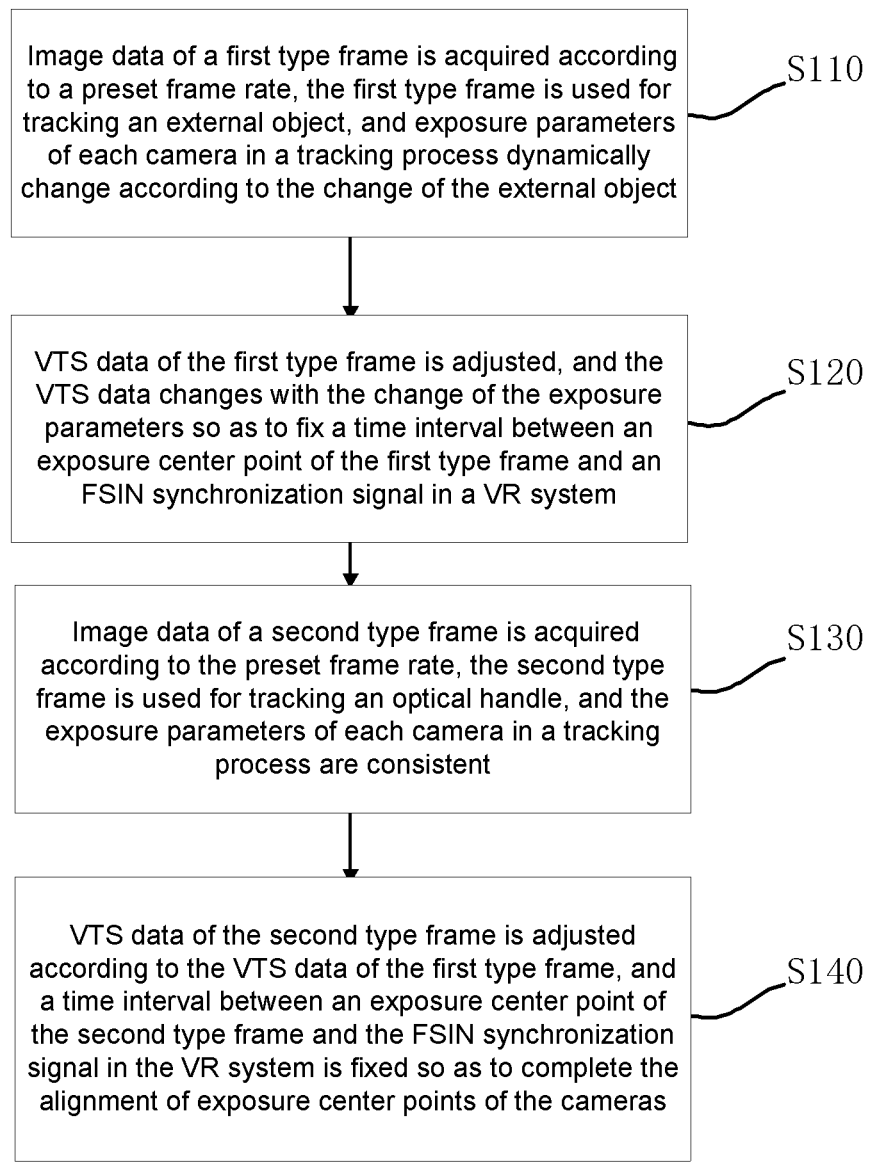
FIG. 1 is a flowchart of a method for aligning exposure center points of multiple cameras in a VR system according to an embodiment of the present disclosure.
Figure 2:
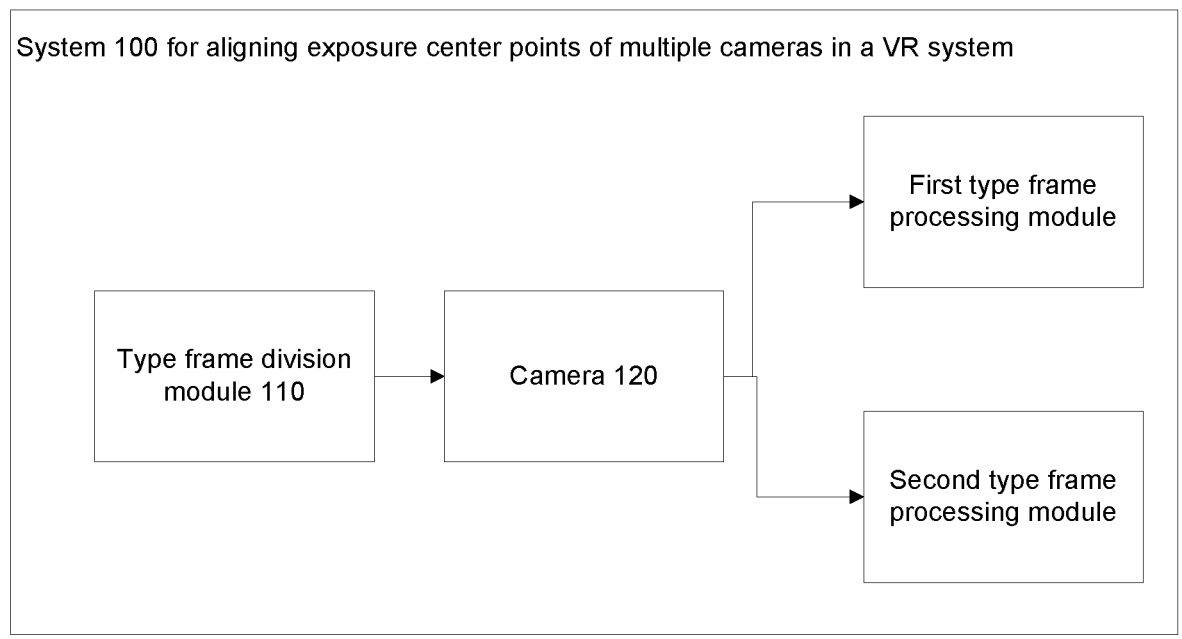
FIG. 2 is a schematic diagram of a system for aligning exposure center points of multiple cameras in a VR system according to an embodiment of the present disclosure.

In order to explain the method for aligning exposure center points of multiple cameras in a VR system provided by the embodiment of the present disclosure, FIG. 1 exemplifies a method for aligning exposure center points of multiple cameras in a VR system according to an embodiment of the present disclosure. FIG. 2 exemplifies a system for aligning exposure center points of multiple cameras in a VR system according to an embodiment of the present disclosure.

The following description of exemplary embodiments is only illustrative actually, and is not used as any limitation for the present disclosure and the application or use thereof. Technologies and devices known by those of ordinary skill in the related art may not be discussed in detail.

However, where appropriate, the technologies and the devices shall be regarded as part of the description.

As shown in FIG. 1, the method for aligning exposure center points of multiple cameras in a VR system provided according to the embodiment of the present disclosure includes the following steps.

In S110, image data of a first type frame is acquired according to a preset frame rate, the first type frame is used for tracking an external object, and exposure parameters of each camera in a tracking process dynamically change according to the change of the external object.

In S120, VTS data of the first type frame is adjusted, and the VTS data changes with the change of the exposure parameters so as to fix a time interval between an exposure center point of the first type frame and an FSIN synchronization signal in a VR system.

In S130, image data of a second type frame is acquired according to the preset frame rate, the second type frame is used for tracking an optical handle, and the exposure parameters of each camera in a tracking process are consistent.

In S140, VTS data of the second type frame is adjusted according to the VTS data of the first type frame, and a time interval between an exposure center point of the second type frame and the FSIN synchronization signal in the VR system is fixed so as to complete the alignment of exposure center points of the cameras.

In the embodiment shown in FIG. 1, in step S110, the preset frame rate is a frame rate preset in advance, which needs to be combined with a frame rate of a camera. The frame rate is an integer multiple of a synchronization frame rate. For example, the synchronization frame rate is 30 Hz, and the camera frame rate is 60 Hz. In other words, if the camera frame rate is 60 Hz, in fact, images obtained by the camera may be respectively a 30 Hz head image and a 30 Hz hand image. It should be noted that the synchronization frame rate may be 30 Hz and may also be 15 Hz. If image data is acquired at 90 Hz, the image data may be a 30 Hz head image and a 60 Hz hand image, and the order of combination during acquisition may be a head image, a hand image and a hand image. The specific value of the preset frame rate is not particularly limited. In the present embodiment, the image data is acquired at 60 Hz, including a first type frame at 30 Hz and a second type frame at 30 Hz.

As shown in FIG. 1, in step S110, the first type frame is used for tracking an external object. The external object is an external environment or a human body part, i.e. the first type frame is an image of the external environment or the human body part. If a VR system only acquires an external environment and a handle, the external object is an external environment, i.e. the first type frame is an external environment image. In a specific embodiment, image data is acquired at a frame rate of 60 Hz. A first frame firstly acquires an external environment to form an external environment image of 30 Hz so as to realize a Head 6 DOF function of the whole VR system. A second frame acquires a handle to form a handle image at 30 Hz so as to track an optical handle to realize a Hand 6DOF function. At this time, the first type frame refers to the external environment image formed by acquiring the external environment. In another specific embodiment, image data is acquired at a frame rate of 30 Hz, so as to achieve 15 Hz synchronization. Specifically, a first frame and a second frame firstly acquire a head image, and a third frame and a fourth frame acquire an image of a handle. In the present embodiment, the first type frame refers to the acquired head image. The first type frame is an image of an external object of the first few frames, no matter how many frames of an image of an external object are acquired firstly and then an image of a handle is acquired. In other words, the first type frame is a non-handle image acquired in addition to tracking a handle, and may be an external environment image or a human body part image.

As shown in FIG. 1, in step S110, the exposure parameters of each camera in the tracking process dynamically change according to the change of the external object. Multiple cameras keep working synchronously. Since a mounting position of each camera is different, the external environment corresponding to each camera is also different. In order to ensure the tracking accuracy and ensure the consistency of the output of each image in different environments, the exposure parameters of each camera also need to be different. When an environment in which the external object is located is darker, the exposure parameters are greater. When the environment in which the external object is located is brighter, the exposure parameters are smaller. That is to say, an exposure time of a camera in a dark environment is set to be longer, and an exposure time of a camera in a bright environment is set to be shorter. In this case, only when the alignment of exposure center points is realized, it can be ensured that the moments of multiple cameras in data acquisition are consistent, and multiple cameras will also have the same time stamp.

In the embodiment shown in FIG. 1, before step S120, it is necessary to calculate a scanning time of each line of data according to HTS settings of a data image and a clock frequency in the VR system, and a default VTS value of an image sensor in the VR system is obtained. Then, VTS data of the first type frame is adjusted. The process of adjusting the VTS data of the first type frame includes the following steps.

In S121, exposure parameters of the first type frame are obtained.

In S122, VTS data of the first type frame is calculated through the exposure parameters, and the VTS data is written into a register of the image sensor.

The VTS data changes with the change of the exposure parameters. Specifically, if the exposure parameters are increased, a value of the VTS data is increased, and if the exposure parameters are reduced, a value of the VTS data is reduced, so as to fix a time interval between the exposure center point of the first type frame and the FSIN synchronization signal in the VR system, thereby ensuring that the center points of multiple cameras are aligned when the multiple cameras acquire the image data of the first type frame.

As shown in FIG. 1, in step S130, a second type frame is acquired according to the preset frame rate, and image data of the second type frame is used for tracking an optical handle. In a specific embodiment, image data is acquired at a frame rate of 60 Hz. A first frame firstly acquires an external environment to form an external environment image of 30 Hz so as to realize a Head 6 DOF function of the whole VR system. A second frame acquires a handle to form a handle image at 30 Hz so as to track an optical handle to realize a Hand 6DOF function. At this time, the second type frame refers to the handle image formed by tracking the handle. In another specific embodiment, image data is acquired at a frame rate of 30 Hz, so as to achieve 15 Hz synchronization. Specifically, a first frame and a second frame firstly acquire a head image, and a third frame and a fourth frame acquire an image of a handle. In the present embodiment, the second type frame refers to the acquired handle image. The second type frame is the acquired handle image, no matter how many frames of an image of an external object are acquired firstly and then an image of a handle is acquired.

In the embodiment shown in FIG. 1, in step S130, since the brightness of the handle is relatively large compared with the environment, and meanwhile, in order to reduce the image persistence when the handle moves rapidly, the exposure parameter (exposure time) of each camera is set to be small (several tens to several hundreds of microseconds) in the process of tracking the optical handle, and the exposure time of multiple cameras is set to be the same parameter, so that the exposure parameter (exposure time) of each camera remains consistent in the process of tracking the optical handle. According to the characteristics of the cameras, the image exposure center points of the second type frames of the multiple cameras are aligned, i.e. the time interval between the exposure center point of the image of the second type frame and the FSIN synchronization signal is fixed. Therefore, in step S140, the VTS data of the second type frame is adjusted according to the VTS data of the first type frame, and then the time interval between the exposure center point of the second type frame and the FSIN synchronization signal in the VR system is fixed, thereby completing the alignment of the exposure center points of the cameras.

In the embodiment shown in FIG. 1, in step S140, the process of adjusting VTS data of the second type frame according to the VTS data of the first type frame includes the following steps. A sum of the value of the VTS data of the second type frame and the value of the VTS data of the first type frame is taken as a fixed value. When the sum of the value of the VTS data of the second type frame and the value of the VTS data of the first type frame is always the same value, the image data of the first type frame and the second type frame can be stably output at a specific frame rate, so as to realize stable output of a camera at the preset frame rate, thereby realizing alignment of the center points of the first type frame and the second type frame. In the whole acquisition process of the VR system acquiring image data, the first type frame, the second type frame, the first type frame, the second type frame and so on are successively acquired. The process is cycled so as to realize the whole VR tracking process. Therefore, only the process of aligning the center points of the first type frames and second type frames is cycled, and the alignment of the center points of the first type frame and the second type frame is repeated successively, so as to realize the alignment of the exposure center points of the cameras in the whole VR tracking process.

It can be seen from the above implementation that in the method for aligning exposure center points of multiple cameras in a VR system provided by the present disclosure, acquired image data is divided into a first type frame and a second type frame, and the first type frame and the second type frame are processed respectively. The first type frame is used for tracking an external object, and exposure parameters of a camera dynamically change according to the change of the external object in a tracking process, thereby adjusting VTS data of the first type frame so that the VTS data changes with the change of the exposure parameters so as to fix a time interval between an exposure center point of the first type frame and an FSIN synchronization signal in a VR system. Exposure parameters of a camera in a tracking process of the second type frame are consistent. It can be easily achieved that an exposure center point of the second type frame has a fixed time interval with the FSIN synchronization signal in the VR system, thereby completing the alignment of center points of the first type frame and the second type frame. When the remaining image data is obtained, the alignment of the center points of the first type frame and the second type frame are successively and repeatedly completed, and then the exposure center points of the cameras in the whole VR tracking process are aligned. Thus, even if more cameras are added to meet optical handle tracking requirements, each camera is set with different exposure parameters, and the alignment of exposure center points can be completed, so as to realize the stable output of the whole VR system and improve the comfort and immersion of users.

As shown in FIG. 2, an embodiment of the present disclosure also provides a system 100 for aligning exposure center points of multiple cameras in a VR system, configured to implement the foregoing method for aligning exposure center points of multiple cameras in a VR system. The system includes a type frame division module 110, a camera 120, a first type frame processing module 130 and a second type frame processing module 140. The type frame division module 110 is configured to instruct the camera 120 to successively obtain a first type frame and a second type frame, i.e. instruct the camera 120 to successively acquire an external object and a light-emitting handle, and divide the image data acquired by the camera 120 into a first type frame and a second type frame. The camera 120 is configured to successively acquire image data of the external object or the light-emitting handle according to the instruction of the type frame division module 110, and acquire image data according to a preset frame rate. The first type frame processing module 130 is configured to adjust VTS data of the first type frame so that the VTS data changes with the change of the exposure parameters so as to fix a time interval between an exposure center point of the first type frame and an FSIN synchronization signal in a VR system. The second type frame processing module 140 is configured to adjust VTS data of the second type frame according to the VTS data of the first type frame, and fix a time interval between an exposure center point of the second type frame and the FSIN synchronization signal so as to complete the alignment of exposure center points of the cameras.

It can be seen from the above implementation that according to the system for aligning exposure center points of multiple cameras in a VR system provided by the embodiment of the present disclosure, a type frame division module instructs a camera to successively obtain a first type frame and a second type frame, the camera acquires image data of the first type frame and the second type frame according to a preset frame rate, and then a first type frame processing module and a second type frame processing module process VTS data of the first type frame and the second type frame so as to align exposure center points of the first type frame and the second type frame. When the remaining image data is obtained, the alignment of the center points of the first type frame and the second type frame are successively and repeatedly completed, and then the exposure center points of the cameras in the whole VR tracking process are aligned. Thus, even if more cameras are added to meet optical handle tracking requirements, each camera is set with different exposure parameters, and the alignment of exposure center points can be completed, so as to realize the stable output of the whole VR system and improve the comfort and immersion of users.

An embodiment of the present disclosure also provides a computer-readable storage medium. The computer-readable storage medium stores a computer program. The computer program is configured to perform, when executed, the steps in any one of the above method embodiments.

An embodiment of the present disclosure also provides an electronic device, which includes a memory and a processor. The memory stores a computer program. The processor is configured to run the computer program to perform the steps in any one of the above method embodiments.

The method and system for aligning exposure center points of multiple cameras in a VR system proposed according to the present disclosure are described above by way of example with reference to the accompanying drawings. However, those skilled in the art should understand that various improvements can be made to the method and system for aligning exposure center points of multiple cameras in a VR system proposed in the present disclosure, without departing from the content of the present disclosure. Therefore, the scope of protection of the present disclosure should be determined by the content of the appended claims.

What is claimed is:

1. A method for aligning exposure center points of multiple cameras in a Virtual Reality (VR) system, comprising:
   acquiring image data of a first type frame taken by the multiple cameras according to a preset frame rate, the first type frame being used for tracking an external object, and exposure parameters of each camera in a tracking process dynamically changing according to the change of the external object;
   adjusting Vertical Timing Size (VTS) data of the first type frame, the VTS data changing with the change of the exposure parameters so as to fix a time interval between an exposure center point of the first type frame and a Frame Synchronization Input (FSIN) synchronization signal in a VR system;
   acquiring image data of a second type frame taken by the multiple cameras according to the preset frame rate, the second type frame being used for tracking an optical handle, and the exposure parameters of each camera in a tracking process being consistent; and
   adjusting VTS data of the second type frame according to the VTS data of the first type frame, and fixing a time interval between an exposure center point of the second type frame and the FSIN synchronization signal so as to complete the alignment of exposure center points of the cameras, wherein the image data of the first type frame and the image data of the second type frame are acquired successively in a whole acquiring process and adjusting the VTS data of the second type frame according to the VTS data of the first type frame comprises: taking a sum of the value of the VTS data of the second type frame plus the value of the VTS data of the first type frame always as a same value in the whole acquiring process such that the image data of the first type frame and the second type frame can be stably output at a specific frame rate.

2. The method for aligning exposure center points of multiple cameras in a VR system according to claim 1, wherein the preset frame rate is 60 Hz.

3. The method for aligning exposure center points of multiple cameras in a VR system according to claim 2, wherein the external object is an external environment or a human body part.

4. An electronic device, comprising: a memory, a processor, and a computer program that is stored on the memory and executable on the processor, wherein the processor, when executing the computer program, implements the steps of the method as claimed in claim 2.

5. An electronic device, comprising: a memory, a processor, and a computer program that is stored on the memory and executable on the processor, wherein the processor, when executing the computer program, implements the steps of the method as claimed in claim 3.

6. The method for aligning exposure center points of multiple cameras in a VR system according to claim 1, wherein before adjusting VTS data of the first type frame, the method further comprises:
calculating a scanning time of each line of data according to Horizontal Timing Size (HTS) settings of a data image and a clock frequency in the VR system, and obtaining a default VTS value of an image sensor in the VR system.

7. The method for aligning exposure center points of multiple cameras in a VR system according to claim 4, wherein the process of adjusting VTS data of the first type frame comprises:
obtaining exposure parameters of the first type frame; and
calculating VTS data of the first type frame through the exposure parameters, and writing the VTS data into a register of the image sensor.

8. An electronic device, comprising: a memory, a processor, and a computer program that is stored on the memory and executable on the processor, wherein the processor, when executing the computer program, implements the steps of the method as claimed in claim 6.

9. An electronic device, comprising: a memory, a processor, and a computer program that is stored on the memory and executable on the processor, wherein the processor, when executing the computer program, implements the steps of the method as claimed in claim 7.

10. The method for aligning exposure center points of multiple cameras in a VR system according to claim 1, wherein in the process of dynamic change of exposure parameters of each camera in a tracking process according to the change of the external object,
as an environment of the external object is darker, the exposure parameters are larger; and
as an environment of the external object is brighter, the exposure parameters are smaller.

11. The method for aligning exposure center points of multiple cameras in a VR system according to claim 6, wherein in the process of change of the VTS data with the change of the exposure parameters,
when the exposure parameters are increased, a value of the VTS data is increased; and
when the exposure parameters are reduced, a value of the VTS data is reduced.

12. An electronic device, comprising: a memory, a processor, and a computer program that is stored on the memory and executable on the processor, wherein the processor, when executing the computer program, implements the steps of the method as claimed in claim 10.

13. An electronic device, comprising: a memory, a processor, and a computer program that is stored on the memory and executable on the processor, wherein the processor, when executing the computer program, implements the steps of the method as claimed in claim 11.

14. The method for aligning exposure center points of multiple cameras in a VR system according to claim 1, wherein
center points of the first type frame and the second type frame are aligned after the process of fixing a time interval between an exposure center point of the second type frame and the FSIN synchronization signal in the VR system; and
in the whole acquisition process of the VR system acquiring image data, the center points of the first type frame and the second type frame are aligned successively and repeatedly so as to align exposure center points of cameras in the whole VR tracking process.

15. An electronic device, comprising: a memory, a processor, and a computer program that is stored on the memory and executable on the processor, wherein the processor, when executing the computer program, implements the steps of the method as claimed in claim 14.

16. A system for aligning exposure center points of multiple cameras in a VR system, configured to implement the method for aligning exposure center points of multiple cameras in a VR system as claimed in claim 1, comprising:
a type frame division module, the multiple cameras, a first type frame processing module and a second type frame processing module, wherein the type frame division module is configured to instruct the multiple cameras to successively obtain a first type frame and a second type frame;
the multiple cameras are configured to successively acquire image data of the first type frame and the second type frame according to the instruction of the type frame division module, and acquire image data according to a preset frame rate;
the first type frame processing module is configured to adjust VTS data of the first type frame so that the VTS data changes with the change of the exposure parameters so as to fix a time interval between an exposure center point of the first type frame and an FSIN synchronization signal in a VR system; and
the second type frame processing module is configured to adjust VTS data of the second type frame according to the VTS data of the first type frame, and fix a time interval between an exposure center point of the second type frame and the FSIN synchronization signal so as to complete the alignment of exposure center points of the cameras,
wherein VTS data of the second type frame is adjusted according to the VTS data of the first type frame comprises: taking a sum of the value of the VTS data of the second type frame and the value of the VTS data of the first type frame always as a same value in the whole acquiring process such that the image data of the first type frame and the second type frame can be stably output at a specific frame rate.

17. A non-transitory computer-readable storage medium, a computer program is stored in the non-transitory computer-readable storage medium, when computer program is executed by a processor, the computer program implements the steps of the method as claimed in claim 1.

18. An electronic device, comprising: a memory, a processor, and a computer program that is stored on the memory and executable on the processor, wherein the processor, when executing the computer program, implements the steps of the method as claimed in claim 1.

* * * * *